US012568169B2

(12) United States Patent
Shim et al.

(10) Patent No.: US 12,568,169 B2
(45) Date of Patent: Mar. 3, 2026

(54) SCREENING CALLS NATIVELY IN AN IP MULTIMEDIA SUBSYSTEM NETWORK

(71) Applicant: T-Mobile USA, Inc., Bellevue, WA (US)

(72) Inventors: Anselmo Myungsup Shim, Bellevue, WA (US); Jim Udom, Woodinville, WA (US); Jason Cataquis, Bellevue, WA (US); Alejandro Lucero, Maple Valley, VA (US); Saqib Badar, Bellevue, WA (US); Albert Bryan Kwong, Kent, WA (US)

(73) Assignee: T-Mobile USA, Inc, Bellevue, WA (US)

( * ) Notice: Subject to any disclaimer, the term of this patent is extended or adjusted under 35 U.S.C. 154(b) by 198 days.

(21) Appl. No.: 18/582,348

(22) Filed: Feb. 20, 2024

(65) Prior Publication Data

US 2025/0267214 A1     Aug. 21, 2025

(51) Int. Cl.
| | |
|---|---|
| *H04M 3/436* | (2006.01) |
| *G10L 17/14* | (2013.01) |
| *G10L 17/26* | (2013.01) |
| *H04M 3/493* | (2006.01) |
| *H04M 3/533* | (2006.01) |

(52) U.S. Cl.
CPC ........... *H04M 3/4365* (2013.01); *G10L 17/14* (2013.01); *G10L 17/26* (2013.01); *H04M 3/493* (2013.01); *H04M 3/53366* (2013.01); *H04M 2201/405* (2013.01); *H04M 2203/252* (2013.01)

(58) Field of Classification Search
None
See application file for complete search history.

(56) References Cited

U.S. PATENT DOCUMENTS

| | | | |
|---|---|---|---|
| 6,680,935 | B1 | 1/2004 | Kung et al. |
| 6,831,966 | B1 | 12/2004 | Tegan et al. |
| 6,909,776 | B2 | 6/2005 | Holt et al. |
| 7,043,232 | B2 | 5/2006 | Pelaez et al. |
| 7,076,048 | B2 | 7/2006 | Lee et al. |
| 7,149,303 | B1 | 12/2006 | Laurinavichus |

(Continued)

FOREIGN PATENT DOCUMENTS

| | | |
|---|---|---|
| EP | 1766950 A2 | 3/2007 |
| EP | 2438737 B1 | 3/2017 |

(Continued)

*Primary Examiner* — Antim G Shah
(74) *Attorney, Agent, or Firm* — Perkins Coie LLP

(57) ABSTRACT

A system of a telecommunications network that uses IP Multimedia Subsystem (IMS) network elements to screen inbound calls. A Media Resource Function (MRF) intercepts an inbound call and uses various techniques to screen the call. The MRF redirects the call to an interactive voice response (IVR) system, which prompts the caller to state the caller's name, records the caller's response, and relays it to the called subscriber, who can then decide to accept or reject the call. The system can present a random number challenge to the caller. The system can use machine learning analytics and a large language model (LLM) to analyze the response's contents, accepting the call only if it relates to a topic allowed by the subscriber, perform audio analysis to determine whether the caller sounds robotic, or detect whether the response contains other known robocall markers.

19 Claims, 5 Drawing Sheets

(56)                    References Cited

U.S. PATENT DOCUMENTS

| | | | |
|---|---|---|---|
| 7,177,627 | B2 | 2/2007 | Melaku et al. |
| 7,245,612 | B2 | 7/2007 | Petty et al. |
| 7,263,177 | B1 | 8/2007 | Paterik et al. |
| 7,391,853 | B2 | 6/2008 | Holt et al. |
| 7,603,433 | B1 | 10/2009 | Paterik |
| 7,920,693 | B2 | 4/2011 | Sharpe et al. |
| 8,155,297 | B1 | 4/2012 | Dhir et al. |
| 8,180,024 | B2 | 5/2012 | Mani |
| 8,259,911 | B1 | 9/2012 | Trandal et al. |
| 8,270,592 | B2 | 9/2012 | Sharpe et al. |
| 8,300,796 | B2 | 10/2012 | Mani |
| 8,483,365 | B1 | 7/2013 | Baxter |
| 8,509,418 | B1 | 8/2013 | Chadha |
| 9,407,451 | B1 | 8/2016 | Mistry et al. |
| 11,463,582 | B1 | 10/2022 | Serban |
| 2005/0096029 | A1 | 5/2005 | Pelaez et al. |
| 2011/0134804 | A1 | 6/2011 | Maes |
| 2017/0171387 | A1* | 6/2017 | Vendrow ............... H04W 40/00 |
| 2018/0213088 | A1 | 7/2018 | Choe et al. |
| 2023/0008822 | A1* | 1/2023 | Serban ..................... G06N 3/08 |
| 2023/0252190 | A1* | 8/2023 | Mossoba ............. G06F 21/6254 |
| | | | 726/26 |

FOREIGN PATENT DOCUMENTS

| | | | |
|---|---|---|---|
| WO | 2000041382 | A1 | 7/2000 |
| WO | 2003055184 | A1 | 7/2003 |
| WO | 2006004862 | A2 | 1/2006 |
| WO | 2010141590 | A2 | 12/2010 |

* cited by examiner

500

SCREENING CALLS NATIVELY IN AN IP MULTIMEDIA SUBSYSTEM NETWORK

BACKGROUND

A robocall is a phone call that uses a computerized autodialer to deliver a pre-recorded message, as if from a robot. Robocalls are often associated with political and telemarketing phone campaigns but can also be used for public service or emergency announcements. Multiple businesses and telemarketing companies use autodialing software to deliver prerecorded messages to millions of users. Some robocalls use personalized audio messages to simulate an actual personal phone call. The service is also viewed as prone to association with scams. Call screening is the process of evaluating the characteristics of a telephone call before deciding how or whether to answer it. Some methods may include listening to the message being recorded on an answering machine or voicemail, checking a caller identification display to see who or where the call is from, checking the time or date which a call or message was received, and prescreening callers to a request line at a radio station or call-in talk show before they are allowed on the air.

BRIEF DESCRIPTION OF THE DRAWINGS

Detailed descriptions of implementations of the present technology will be described and explained through the use of the accompanying drawings.

Figure 1:
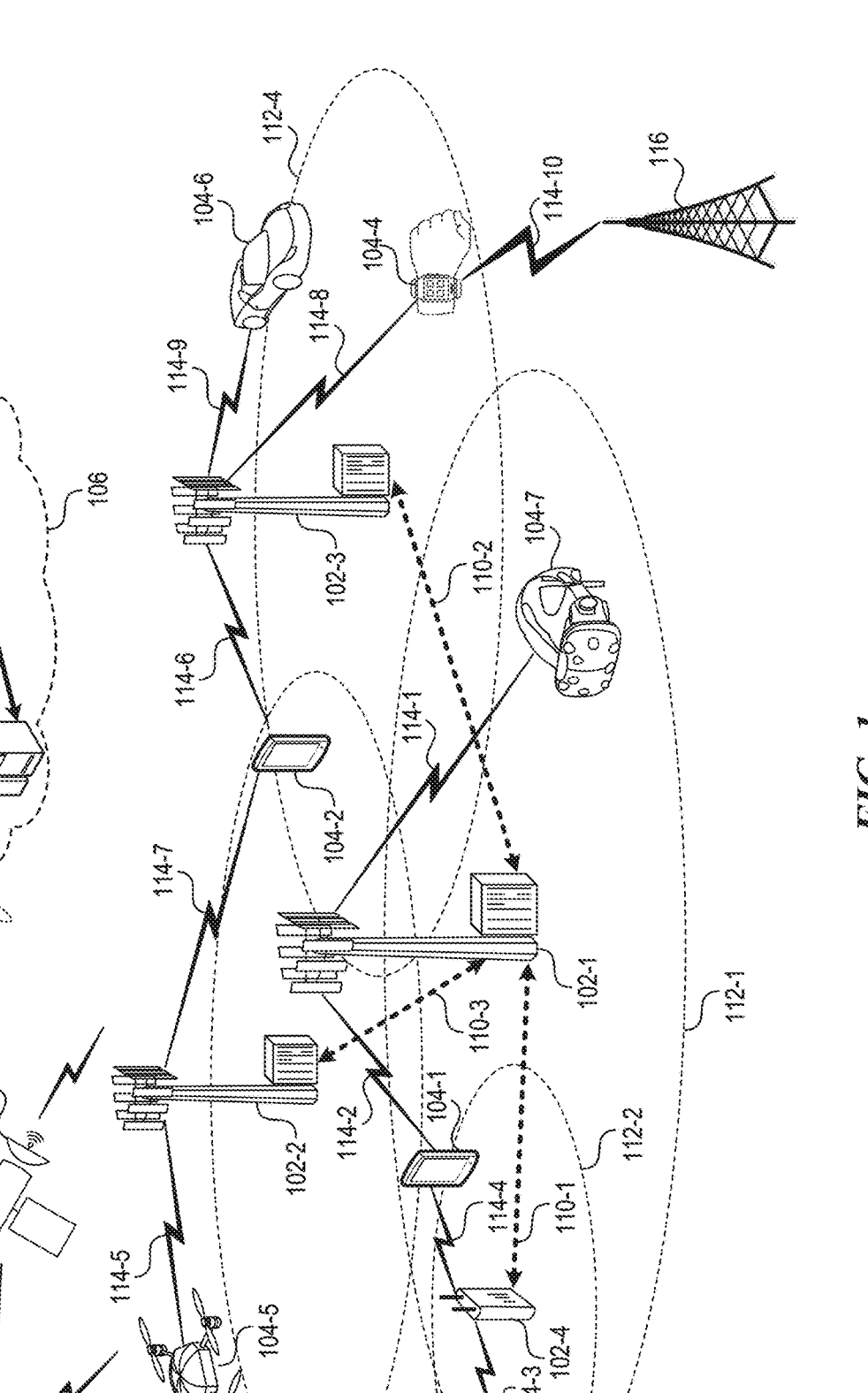
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology discloses network-based call screening methods using IP Multimedia Subsystem (IMS)-native network elements and optional machine learning (ML) analytics and a large language model (LLM) implementation to overcome limitations. The disclosed technology specifically relates to a telecommunications system for identifying and rejecting inbound spam calls and robocalls to a subscriber of an IMS-based telecommunications network. Various techniques of identifying and rejecting spam calls and robocalls using existing network elements of an IMS telecommunications network are discussed.

Traditional methods of filtering out scam, fraud, and robocalls are very limited and are only reactive. Most advanced methods of call screening that are implemented today rely on processing done on a user's device or are implemented outside a standards-based IP Multimedia Subsystem (IMS) using non-standard call flows, which can result in increased call latency, poor call quality, and lack of regulatory controls. Device-based call screening techniques can also increase demand from the device's battery or may not function well on lower-end devices that lack the necessary processing power.

In one implementation of the technology, the system comprises at least one Media Resource Function (MRF) and at least one Telephony Application Server (TAS). The TAS is a network element in an IMS network that can carry out functions that are not directly related to the routing of messages through the network, including automatic call forwarding, conference bridges, and call-termination or subscriber-independent applications including local number portability and unified messaging. The TAS can be a Terminating TAS (T-TAS), which performs TAS functions on inbound calls. The MRF is a network element in an IMS network that can provide multimedia-related functions, such as mixing of streams of audio and audio/video conferences, controlling interactive voice response (IVR) sessions, and playing back multimedia. The TAS and MRF can be communicatively coupled with each other. The system can receive an inbound call from a caller at the T-TAS. The system can intercept the inbound call and forward it to the MRF for further processing.

The MRF can be configured to present various challenges to the caller via an IVR system. In one embodiment, the MRF can prompt the caller to state their name. The MRF can record the caller's response and forward it to a mobile device of a called subscriber. The subscriber, upon hearing the caller's response, can decide whether to accept the call by pressing a first button on a keypad of the mobile device, reject the call by pressing a second button on a keypad of the mobile device, or redirect the call to a voicemail system of the telecommunications network by pressing a third button on the keypad of the mobile device. In another embodiment, the MRF, via the IVR system, can prompt the caller to press at least one randomized number on a keypad of the caller's device. If the caller responds successfully by pressing the correct number on the keypad, the system can identify the caller as a human caller rather than a robocaller and can forward the call to the subscriber. In yet another embodiment, upon identifying the caller as a robocaller, the system can redirect the inbound call directly to a voicemail system.

In another implementation of the technology, the system can intercept an inbound call and screen it for context using ML analytics and an LLM. In one implementation, the ML analytics and LLM can be implemented at the MRF. In another implementation, the ML analytics and LLM can be implemented in a stand-alone network element in the telecommunications network. In yet another implementation, the ML analytics and LLM can be combined with another network element in the telecommunications network.

In one embodiment, the system can intercept an inbound call and redirect it to an IVR system. The IVR system can prompt the caller to state a purpose of the call. The system can process the caller's response using ML analytics and LLM to identify if the response contains certain words, phrases, or tonality that are known to the ML analytics and LLM to be associated with spam calls and robocalls. If the system identifies that the inbound call is a spam call or a robocall, it can reject the call. If the system identifies that the inbound call is not a spam call or a robocall, it can accept the call and forward it to the subscriber. In another embodiment, after causing the IVR to prompt the caller to state a purpose of the call, the system can compare the purpose with a custom topic list configured by the subscriber as allowable. If the purpose of the caller matches at least one of the topics on the custom topic list, the system can accept the call and forward it to the subscriber. Otherwise, the system can reject the call. In one example, when the subscriber has configured an allowable list of custom topics to include "Daycare" or "Medical" and a blocked list of custom topics to include all other topics, when the caller responds to the IVR prompt by stating that "I'm calling from the doctor's office-your test results are ready," or "Hello, this is Mary calling from Maple Tree Daycare. I'm reaching out to you because your child had a bathroom accident. Could you please call me back if you can bring her an extra pair of pants?," the system can determine that the purpose of the call matches at least one allowable custom topic and can accept the call and forward it to the subscriber. In another example with the same set of allowable and blocked custom topics, when the caller responds to the IVR prompt by stating that "We've been trying to reach you regarding your vehicle's extended warranty," the system can determine that the purpose of the call does not match any topic on the list of allowable custom topics and can reject the call.

In another embodiment, after causing the IVR to prompt the caller to state a purpose of the call, the system can create an audio fingerprint of the caller by analyzing at least one audio characteristic of a sample of the caller's response. In one implementation, analyzing at least one characteristic of a sample of the caller's response can include determining whether the caller has a robotic tone. In another implementation, analyzing at least one characteristic of a sample of the caller's response can include comparing a waveform of the audio sample to at least one waveform of a robocall sample known to the ML analytics and LLM. In yet another implementation, analyzing at least one characteristic of a sample of the caller's response can include performing a linguistic analysis of the caller's response to determine whether the response contains at least one linguistic pattern known to the ML analytics and LLM as a spam call, robocall, or fraud call.

In another embodiment, the system can redirect the inbound call to a voicemail system and simultaneously forward the call to the subscriber's device. The system can establish a three-way conference call between the caller, the voicemail system, and the subscriber wherein the subscriber can silently listen in to the caller's voicemail response in real time without notice to the caller. The system can further present the subscriber with an option to interrupt the caller's interaction with the voicemail system and connect the call directly to the caller.

In yet another embodiment, the system can receive a Video over LTE (ViLTE) or Video over 5G New Radio (ViNR) call. The system can forward the caller's live video preview feed to the subscriber and present the subscriber with an option to accept or reject the call. If the subscriber accepts the call, the system can remove the video feed and convert the call to a Voice over LTE (VOLTE) or Voice over 5G New Radio (VoNR) call.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
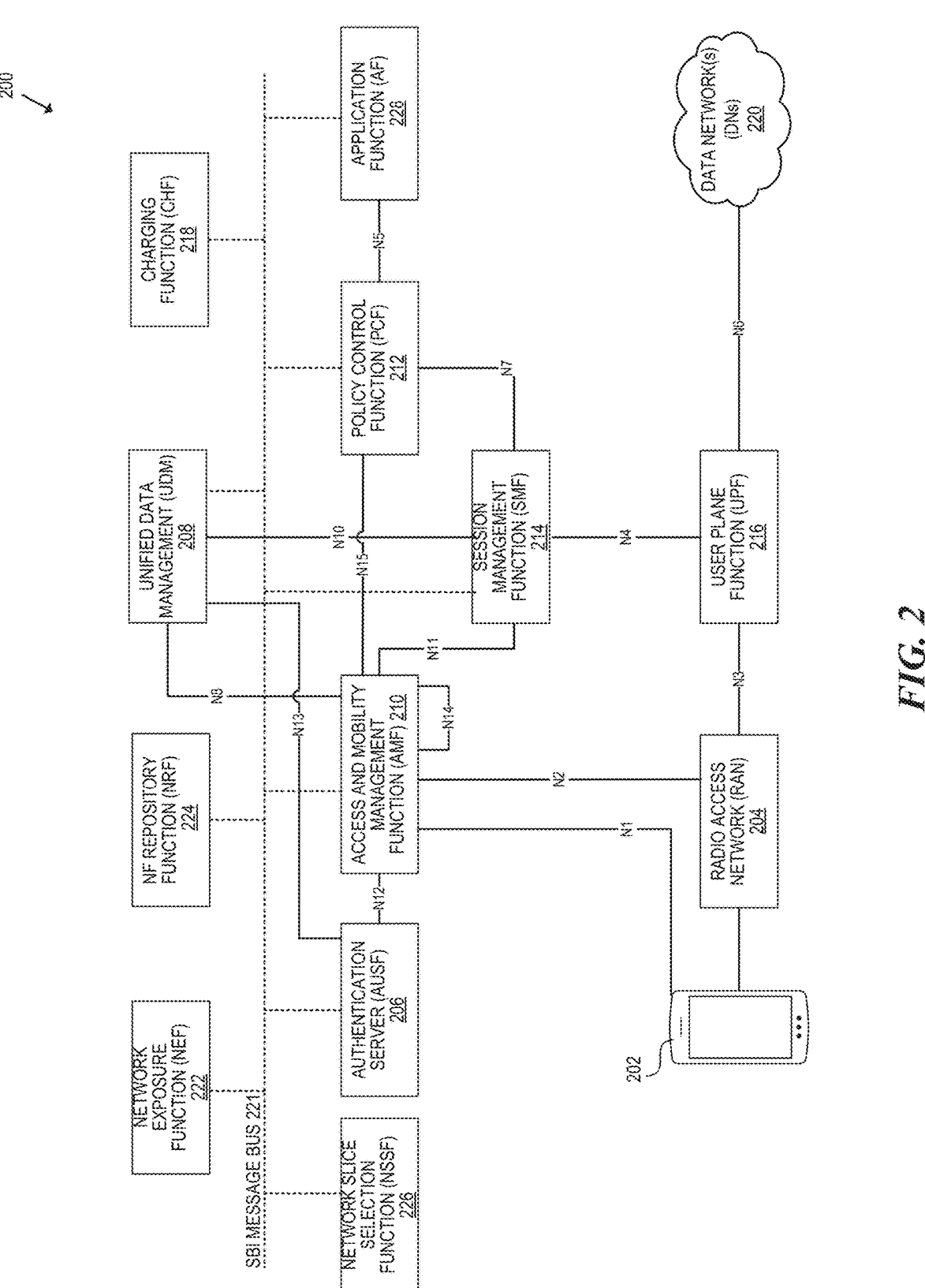
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

System for Screening Calls Natively in an IMS Network

Figure 3:
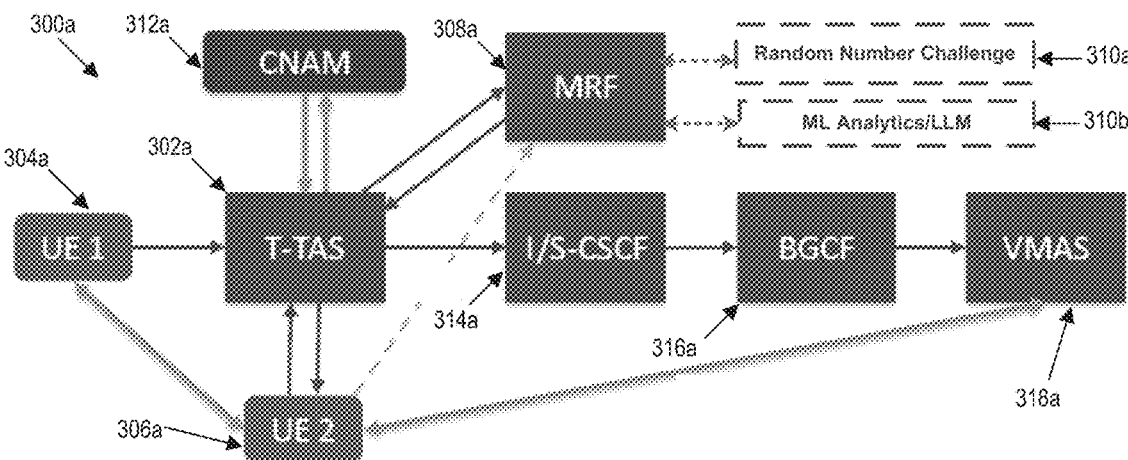
FIG. 3 is a block diagram that illustrates an IP Multimedia Subsystem (IMS)-based telecommunications network that can implement aspects of the present technology.
Figure 3:
Figure 3:
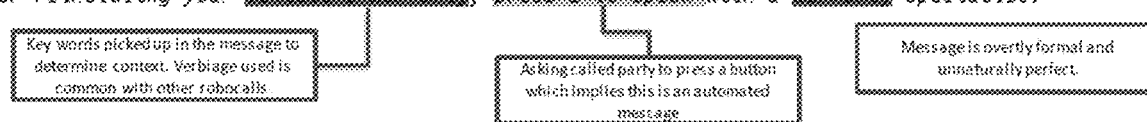

FIG. 3 includes a block diagram that illustrates an IMS-based telecommunications network that can implement aspects of the present technology and an example of an analysis conducted by the system. FIG. 3 illustrates a system 300a of an IMS-based telecommunications network in which at least some aspects of the system are implemented. FIG. 3 also illustrates an example 300b of an analysis conducted by an implementation of a ML analytics and large language model (LLM) 310b. The system receives an inbound call from a caller 304a intended for a subscriber 306a of the telecommunications network. The inbound call is received by the system at a Terminating Telephony Application Server (T-TAS) 302a. The T-TAS 302a can be communicatively coupled with a Media Resource Function (MRF) 308a. The MRF 308a handles a variety of processing tasks on a media stream of the inbound call. The media processing tasks of the MRF 308a can include coordinating and distributing voice traffic associated with a conference call, playing of announcements to the subscriber, and transcoding of voice or video streams to facilitate successful establishment of a call session. In some embodiments, the T-TAS 302a can be communicatively coupled with a Caller Name Delivery function (CNAM) 312a, which is configured to provide a name identification, for example, as Caller ID, of the caller 304a.

In some embodiments, the MRF 308a can be optionally coupled with a random number challenge function 310a that is configured to provide a random number challenge to the caller 304a. The random number challenge function 310a may be a configured as a physically separate network element from the MRF 308*a*, may be collocated with the MRF 308*a*, or may be implemented as an additional logical functionality integrated into the functioning of the MRF 308*a*. The T-TAS 302*a* can forward a SIP (Session Initiation Protocol) INVITE message received from the caller 304*a* to the MRF 308*a*. The MRF 308*a* can be configured to play an announcement to the caller 304*a* based on at least one random number generated by the random number challenge function 310*a*, receive a response to the challenge from the caller 304*a* and, if the response exactly matches a random number included in the random number challenge, accept the call and forward it to the subscriber 306*a*. In some embodiments, the MRF 308*a* can be optionally coupled with a machine learning (ML) analytics and LLM function 310*b*. The ML analytics and LLM function 310*b* may be a con- figured as a physically separate network element from the MRF 308*a*, may be collocated with the MRF 308*a*, or may be implemented as an additional logical functionality inte- grated into the functioning of the MRF 308*a*.

The T-TAS 302*a* can be communicatively coupled with a Call Session Control Function (CSCF). The CSCF can be an Interrogating CSCF (I-CSCF) or a Serving CSCF (S-CSCF). Collectively, the I-CSCF and the S-CSCF can be referred to as I/S-CSCF 314*a*. Functioning as an I-CSCF, the I/S-CSCF 314*a* can handle routing and processing of signaling mes- sages between different IMS entities and can act as an entry point into the IMS network for all inbound SIP requests related to a subscriber 306*a*. Functioning as an S-CSCF, the I/S-CSCF 314*a* can serve as a primary node in the IMS for session control. The I/S-CSCF 314*a* can be communica- tively coupled with a Breakout Gateway Control Function (BGCF) 316*a*, which provides breakout functionality that allows communication between different networks, such as a packet-switched (PS) network and a circuit-switched (CS) network. In some implementations, the system can include a Voicemail Application Server (VMAS) 318*a* that is com- municatively coupled with the BGCF 316*a*. In some imple- mentations, the subscriber 306*a* can manually screen the inbound call by listening to a voicemail being deposited at the VMAS 318*a* by the caller 304*a* and, upon deciding to connect to the caller 304*a* directly, can interrupt the voice- mail and pick up the call. In some implementations, the system can establish a three-way conference call among the caller 304*a*, the subscriber 306*a*, and a voicemail service implemented on the VMAS 318*a* such that the subscriber 306*a* can listen in on the voicemail without notice to the caller 304*a*.

Figure 4:
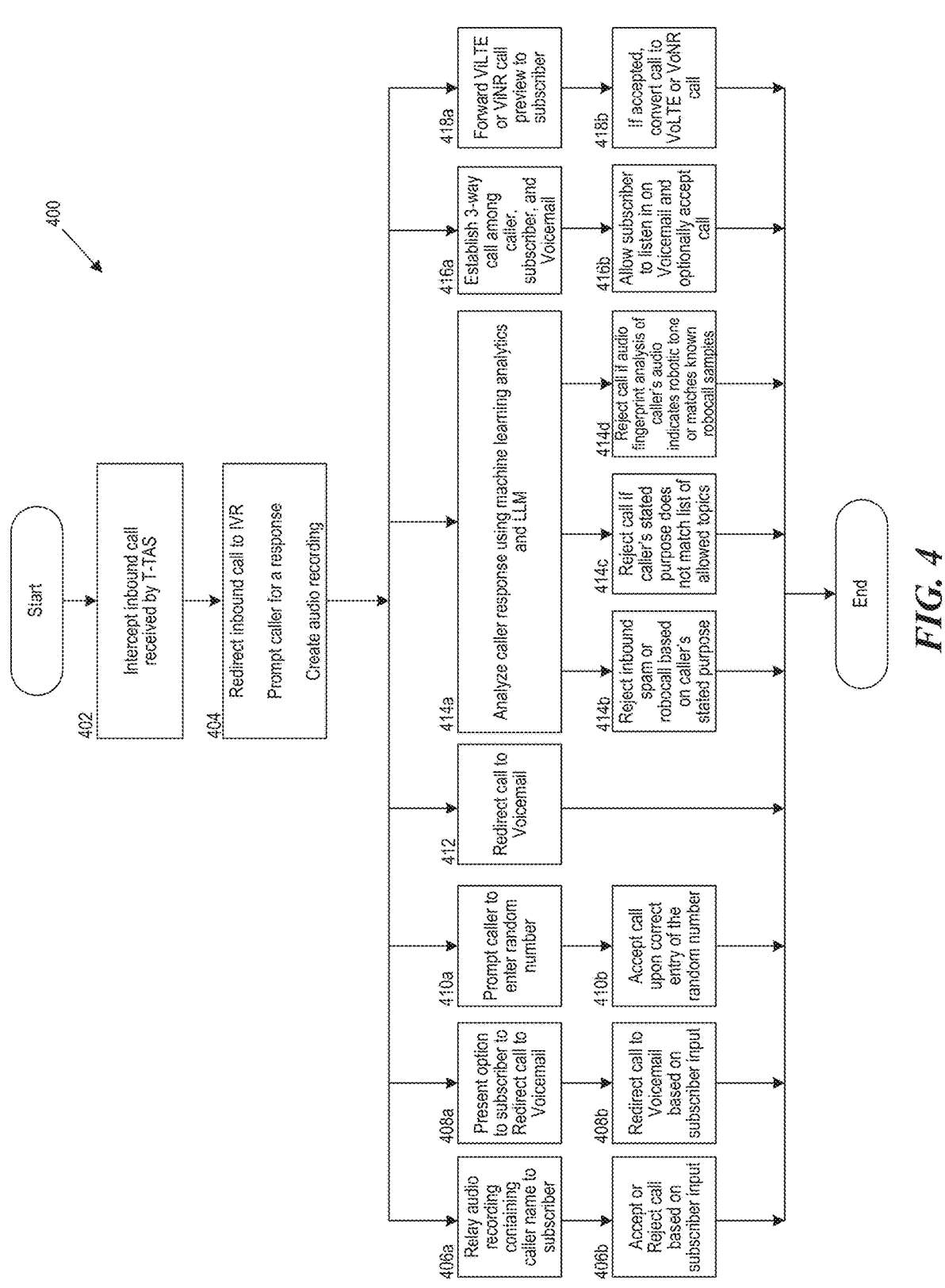
FIG. 4 is a flowchart that illustrates a method for screening inbound calls natively in an IMS-based telecommunications network.

FIG. 4 is a flowchart that illustrates a process 400 for screening inbound calls natively in an IMS-based telecom- munications network. The process 400 is performed by the system of a telecommunications network. The system includes an MRF configured as a network element disposed in the telecommunications network. The MRF includes at least one hardware processor and at least one non-transitory memory storing instructions. At 402, the instructions, when executed by the at least one hardware processor, cause the MRF to intercept an inbound call from a caller to a sub- scriber of the telecommunications network received at a Telephony Application Server (TAS) communicatively coupled to the MRF. At 404, the MRF redirects the inbound call to an interactive voice response (IVR) system. The IVR is configured to present a voice prompt to the caller to state a name of the caller and to create an audio recording of a response given by the caller. At 406*a*, the system can relay the audio recording to the subscriber and present at least one option to the subscriber to select a disposition for the inbound call, wherein the at least one option presented to the subscriber includes an option to accept the call. At 406*b*, the system can either, upon the subscriber selecting the at least one option to accept the call, forward the call to the subscriber or, upon the subscriber selecting the at least one option to reject the call, reject the call.

At 408*a*, the system can present to the subscriber an option to redirect the inbound call to a voicemail system of the telecommunications network. At 408*b*, upon the sub- scriber selecting the at least one option to redirect the inbound call to a voicemail system of the telecommunica- tions network, the system can forward the inbound call to a voicemail system of the telecommunications network.

At 410*a*, the IVR can prompt the caller to enter a number string comprising at least one randomized number. At 410*b*, upon the IVR receiving a response consisting of the same number string comprising at least one randomized number, the system can forward the inbound call to the subscriber. At 412, the system can redirect an inbound call to a voicemail system of the telecommunications network.

At 414*a*, the system can further comprise at least one hardware processor and at least one non-transitory memory storing instructions, which, when executed by the at least one hardware processor, cause the system to implement a ML analytics and large language model (LLM). The ML analytics and LLM can be configured to conduct an analysis of at least one word, at least one phrase, or at least one tonality of an audio sample and determine whether an inbound call is a spam call or a robocall based on the analysis.

At 414*b*, the IVR can be configured to prompt the caller to state a purpose of the inbound call. The ML analytics and LLM can be configured to analyze the purpose of the inbound call stated by the caller, and the system can, upon determination by the ML analytics and LLM that the inbound call is a spam call or a robocall, reject the inbound call.

At 414*c*, the ML analytics and LLM can be further configured to determine a topic of the inbound call and compare the determined topic of the inbound call against a custom topic list comprising at least one allowable topic configured by the subscriber. The system can, upon deter- mination by the ML analytics and LLM that the determined topic of the inbound call does not match any topic in the custom topic list, reject the inbound call.

At 414*d*, the ML analytics and LLM can be further configured to conduct an audio fingerprinting analysis of an audio sample of a voice of the caller to determine whether the caller has a robotic tone, conduct audio fingerprinting analysis of an audio sample of a voice of the caller to determine whether a waveform of the audio sample matches a waveform of at least one audio sample of a robocall known to an operator of the telecommunications network, and conduct linguistic analysis of an audio sample of a voice of the caller to determine whether the audio sample matches at least one linguistic pattern of a fraudulent call known to an operator of the telecommunications network. The system can, upon determination by the ML analytics and LLM that the caller has a robotic tone, the inbound call is a robocall, or the inbound call is a fraudulent call, reject the inbound call.

At 416*a*, the MRF can be further configured to establish a three-way call between the caller, a voicemail system of the telecommunications network, and the subscriber. At 416*b*, the three-way call can be configured to allow the subscriber to silently listen in real time, without notice to the caller, on a voicemail message being left by the caller for the subscriber and to allow the subscriber to interrupt the caller's voicemail message by accepting the call.

At 418*a*, the system can be further configured to receive an inbound video call, wherein the inbound video call is a Video over LTE (ViLTE) or Video over 5G New Radio (ViNR) call. At 418*b*, the system can forward a live video preview feed of the caller to the subscriber, present the subscriber with an option to accept or reject the inbound video call, and, upon selection by the subscriber of an option to accept the inbound video call, terminate the live video preview feed and convert the inbound video call to a Voice over LTE (VOLTE) or Voice over 5G New Radio (VoNR) call.

Computer System

Figure 5:
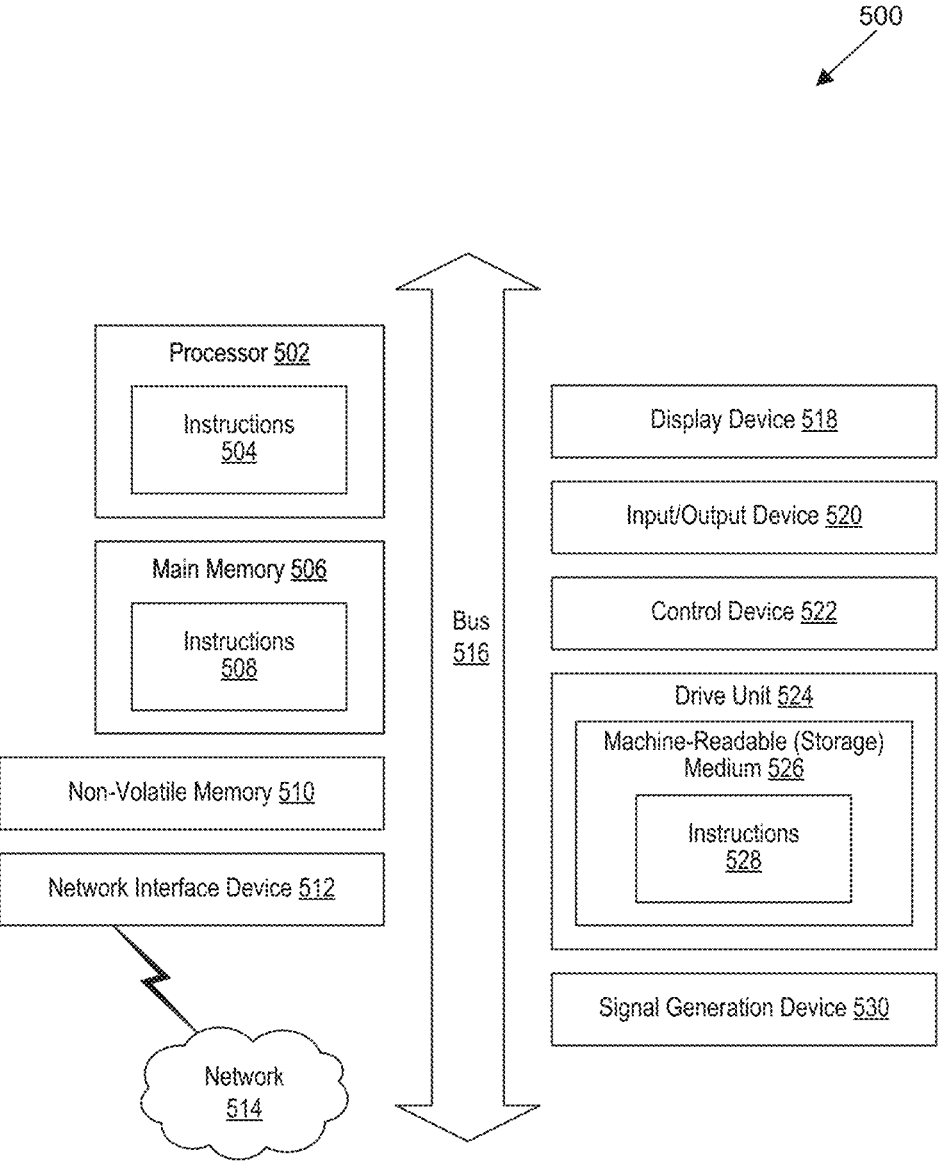
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/ output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system of a telecommunications network comprising a Media Resource Function (MRF) configured as a network element disposed in the telecommunications network, the MRF including:

at least one hardware processor; and at least one non-transitory memory storing instructions, which, when executed by the at least one hardware processor, cause the MRF to:

intercept a first inbound call from a caller to a subscriber of the telecommunications network received at a Telephony Application Server (TAS) communicatively coupled to the MRF;

redirect the first inbound call to an interactive voice response (IVR) system, wherein the IVR is configured to present a voice prompt to the caller to state a name of the caller, and wherein the IVR is configured to create an audio recording of a response given by the caller to the voice prompt;

relay the audio recording to the subscriber of the telecommunications network;

cause the system to cause a device of the subscriber to present at least a first option to the subscriber of the telecommunications network to select a disposition for the first inbound call, wherein the at least a first option presented to the subscriber includes an option to accept the first inbound call;

cause the system, upon the subscriber selecting the option to accept the first inbound call, to forward the first inbound call to the subscriber; and cause the system to implement a machine learning (ML) analytics and large language model (LLM), the ML analytics and LLM being caused to:

upon receiving an eighth inbound call, conduct an audio fingerprinting analysis of an audio sample of a voice of the caller to:

determine whether the caller has a robotic tone, determine whether a waveform of the audio sample matches a waveform of at least one audio sample of a robocall known to an operator of the telecommunications network, or determine whether the audio sample matches at least one linguistic pattern of a fraudulent call known to the operator of the telecommunications network; and wherein the system is caused, upon determining that the caller has a robotic tone, the eighth inbound call is a robocall, or the eighth inbound call is a fraudulent call, reject the eighth inbound call.

2. The system of claim 1 further caused to:

upon receiving a second inbound call, cause the device of the subscriber to present at least a second option to the subscriber;

wherein the at least a second option presented to the subscriber includes an option to reject the second inbound call; and upon the subscriber selecting the option to reject the second inbound call, reject the second inbound call.

3. The system of claim 2 further caused to:

upon receiving a third inbound call, cause the device of the subscriber to present at least a third option to the subscriber, wherein the at least a third option presented to the subscriber includes an option to redirect the third inbound call to a voicemail system of the telecommunications network; and upon the subscriber selecting the option to redirect the third inbound call to a voicemail system of the telecommunications network, forward the third inbound call to a voicemail system of the telecommunications network.

4. The system of claim 1 further caused to:

upon receiving a fourth inbound call, cause the IVR to prompt the caller to enter a number string comprising at least one randomized number; and upon the IVR receiving a response consisting of a number string exactly matching the at least one randomized number, forward the fourth inbound call to the subscriber.

5. The system of claim 1, wherein the MRF is caused to: redirect a fifth inbound call to a voicemail system of the telecommunications network.

6. The system of claim 1 further caused to cause the ML analytics and LLM to:

upon receiving a sixth inbound call, conduct an analysis of at least one word, at least one phrase, or at least one tonality of an audio sample;

determine whether the sixth inbound call is a spam call or a robocall based on the analysis;

wherein the IVR is configured to prompt the caller to state a purpose of the sixth inbound call;

analyze the purpose of the sixth inbound call stated by the caller; and upon determination by the ML analytics and LLM that the sixth inbound call is a spam call or a robocall, reject the sixth inbound call.

7. The system of claim 1 further caused to cause the ML analytics and LLM to:

determine a topic of a seventh inbound call;

compare the determined topic of the seventh inbound call against a custom topic list comprising at least one allowable topic configured by the subscriber; and upon determination by the system that the determined topic of the seventh inbound call does not match any topic in the custom topic list, reject the seventh inbound call.

8. The system of claim 1 further caused to:

upon receiving a ninth inbound call, cause the MRF to establish a three-way call between the caller, a voicemail system of the telecommunications network, and the subscriber, wherein the three-way call is configured to allow the subscriber to silently listen in real time, without notice to the caller, on a voicemail message being left by the caller for the subscriber, and wherein the three-way call is further configured to allow the subscriber to interrupt the caller's voicemail message by accepting the ninth inbound call.

9. The system of claim 1 further caused to, receive an inbound video call, wherein the inbound video call is a Video over LTE (ViLTE) or Video over 5G New Radio (ViNR) call, forward a live video preview feed of the caller to the subscriber;

cause a device of the subscriber to present to the subscriber an option to accept or reject the inbound video call; and upon selection by the subscriber of an option to accept the inbound video call, terminate the live video preview feed and convert the inbound video call to a Voice over LTE (VOLTE) or Voice over 5G New Radio (VoNR) call.

10. A non-transitory, computer-readable storage medium comprising instructions recorded thereon, wherein the instructions, when executed by at least one data processor of a system of a Media Resource Function (MRF) configured as a network element disposed in a telecommunications network, cause the system to:

intercept a first inbound call from a caller to a subscriber of the telecommunications network received at a Telephony Application Server (TAS) communicatively coupled to the MRF;

redirect the first inbound call to an interactive voice response (IVR) system, wherein the IVR is configured to present a voice prompt to the caller to state a name of the caller, and wherein the IVR is configured to create an audio recording of a response given by the caller in response to the voice prompt;

relay the audio recording to the subscriber of the telecommunications network;

cause a device of the subscriber to present at least a first option to the subscriber to select a disposition for the first inbound call, wherein the at least a first option presented to the subscriber includes an option to accept the first inbound call;

cause the telecommunications network, upon the subscriber selecting the option to accept the first inbound call, to forward the first inbound call to the subscriber; and cause the system to implement a machine learning (ML) analytics and large language model (LLM), the ML analytics and LLM being caused to:

upon receiving an eighth inbound call, conduct an audio fingerprinting analysis of an audio sample of a voice of the caller to:

determine whether the caller has a robotic tone, determine whether a waveform of the audio sample matches a waveform of at least one audio sample of a robocall known to an operator of the telecommunications network, or determine whether the audio sample matches at least one linguistic pattern of a fraudulent call known to the operator of the telecommunications network; and wherein the system is caused, upon determining that the caller has a robotic tone, the eighth inbound call is a robocall, or the eighth inbound call is a fraudulent call, reject the eighth inbound call.

11. The non-transitory, computer-readable storage medium of claim 10, wherein the system is further caused to:

upon receiving a second inbound call, cause the device of the subscriber to present at least a second option to the subscriber, wherein the at least a second option presented to the subscriber includes an option to reject the second inbound call, and upon the subscriber selecting the option to reject the second inbound call, reject the second inbound call.

12. The non-transitory, computer-readable storage medium of claim 11, wherein the system is further caused to:

upon receiving a third inbound call, cause the device of the subscriber to present to the subscriber at least a third option to the subscriber, wherein the at least a third option presented to the subscriber includes an option to redirect the third inbound call to a voicemail system of the telecommunications network; and upon the subscriber selecting the option to redirect the third inbound call to a voicemail system of the telecommunications network, forward the third inbound call to a voicemail system of the telecommunications network.

13. The non-transitory, computer-readable storage medium of claim 10, wherein the system is further caused to:

upon receiving a fourth inbound call, cause the IVR to prompt the caller to enter a number string comprising at least one randomized number; and upon the IVR receiving a response consisting of a number string exactly matching the at least one randomized number, forward the fourth inbound call to the subscriber.

14. The non-transitory, computer-readable storage medium of claim 10, wherein the system is further caused to:

redirect a fifth inbound call to a voicemail system of the telecommunications network.

15. The non-transitory, computer-readable storage medium of claim 10, wherein the system is further caused to:

upon receiving a sixth inbound call, establish a three-way call between the caller, a voicemail system of the telecommunications network, and the subscriber, wherein the three-way call is configured to allow the subscriber to silently listen in real time, without notice to the caller, on a voicemail message being left by the caller for the subscriber, and wherein the three-way call is further configured to allow the subscriber to interrupt the caller's voicemail message by accepting the sixth inbound call.

16. The non-transitory, computer-readable storage medium of claim 10, wherein the system is further caused to:

receive an inbound video call, wherein the inbound video call is a Video over LTE (ViLTE) or Video over 5G New Radio (ViNR) call, forward a live video preview feed of the caller to the subscriber, present the subscriber with an option to accept or reject the inbound video call, and upon selection by the subscriber of an option to accept the inbound video call, terminate the live video preview feed and convert the inbound video call to a Voice over LTE (VOLTE) or Voice over 5G New Radio (VoNR) call.

17. A non-transitory, computer-readable storage medium comprising instructions recorded thereon, wherein the instructions, when executed by at least one data processor of a system of a telecommunications network, cause the system to implement a machine learning (ML) analytics and large language model (LLM), the ML analytics and LLM being caused to:

upon a Media Resource Function (MRF) of the system intercepting a first inbound call from a caller to a subscriber of the telecommunications network received at a Telephony Application Server (TAS) communicatively coupled to the MRF and redirecting the first inbound call to an interactive voice response (IVR) system of the telecommunications network, wherein the IVR is configured to prompt the caller to state a purpose of the first inbound call, wherein the IVR is further configured to create an audio recording of a response given by the caller to the voice prompt, wherein the MRF is configured to relay the audio recording to the subscriber of the telecommunications network, wherein the MRF is further configured to cause a device of the subscriber to present at least a first option to the subscriber of the telecommunications network to select a disposition for a fourth inbound call, wherein the at least a first option presented to the subscriber includes an option to accept the fourth inbound call, and wherein the MRF is further configured to, upon the subscriber selecting the option to accept the fourth inbound call, to forward the fourth inbound call to the subscriber;

conduct an analysis of at least one word, at least one phrase, or at least one tonality of an audio sample of a response of the caller, wherein conducting the analysis of the at least one word, at least one phrase, or at least one tonality of the audio sample further comprises conducting an audio fingerprinting analysis of the audio sample to:

determine whether the caller has a robotic tone, determine whether a waveform of the audio sample matches a waveform of at least one audio sample of a robocall known to an operator of the telecommunications network, or determine whether the audio sample matches at least one linguistic pattern of a fraudulent call known to the operator of the telecommunications network;

determine whether the first inbound call is a spam call or a robocall based on the analysis;

analyze a purpose of the first inbound call stated by the caller; and upon determination by the ML analytics and LLM that the first inbound call is a spam call or a robocall, reject the first inbound call.

18. The non-transitory, computer-readable storage medium of claim 17, wherein the ML analytics and LLM is further caused to:

determine a topic of a second inbound call based on a response of the caller to at least one prompt from the IVR; and compare the determined topic of the second inbound call against a custom topic list comprising at least one allowable topic configured by the subscriber, and wherein the system is caused to, upon determination by the ML analytics and LLM that the determined topic of the second inbound call does not match any topic in the custom topic list, reject the second inbound call.

19. The non-transitory, computer-readable storage medium of claim 17, wherein the system is further caused to upon receiving a third inbound call, the ML analytics and LLM is further caused to conduct an audio fingerprinting analysis of an audio sample of a voice of the caller to:

determine whether the caller has a robotic tone;

determine whether a waveform of the audio sample matches a waveform of at least one audio sample of a robocall known to an operator of the telecommunications network;

determine whether the audio sample matches at least one linguistic pattern of a fraudulent call known to an operator of the telecommunications network; and wherein the system is caused to, upon determining that the caller has a robotic tone, the third inbound call is a robocall, or the third inbound call is a fraudulent call, reject the third inbound call.

\* \* \* \* \*